Feb. 12, 1929.

S. B. GORBUTT

FRICTION THRUST FOR CABLE DRUMS

Filed April 6, 1927

1,701,614

INVENTOR
S. B. Gorbutt
BY E. B. Birkenbeuel.
ATTORNEY

Patented Feb. 12, 1929.

1,701,614

UNITED STATES PATENT OFFICE.

SIDNEY B. GORBUTT, OF PORTLAND, OREGON, ASSIGNOR TO WILLAMETTE IRON AND STEEL WORKS, OF PORTLAND, OREGON.

FRICTION THRUST FOR CABLE DRUMS.

Application filed April 6, 1927. Serial No. 181,384.

This invention relates generally to the logging industry, and particularly to a special form of friction applying device for cable handling drums used on logging machinery and other types of hoisting engines.

The first object of this invention is to provide a simple and efficient friction thrust for cable drums which will have no external rotating parts, thereby eliminating the danger arising from such elements and the necessity of guarding same, as well as avoiding the difficulties usually caused by such elements becoming out of balance.

The second object is to so construct the friction thrust mechanism that it will be simple and inexpensive to manufacture and not liable to get out of order.

The third object is to provide excellent lubrication for the wearing parts by completely enclosing same.

The fourth object is to greatly reduce the amount of friction usually developed in other friction thrust devices.

Figure 1:
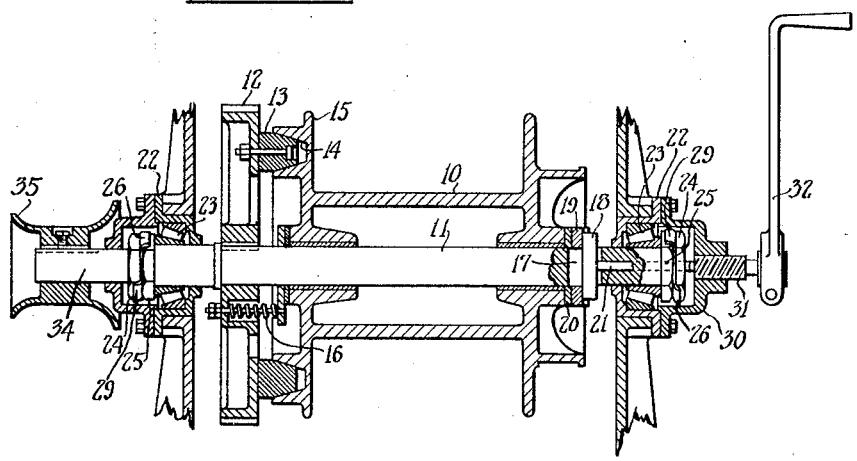
Figure 2:
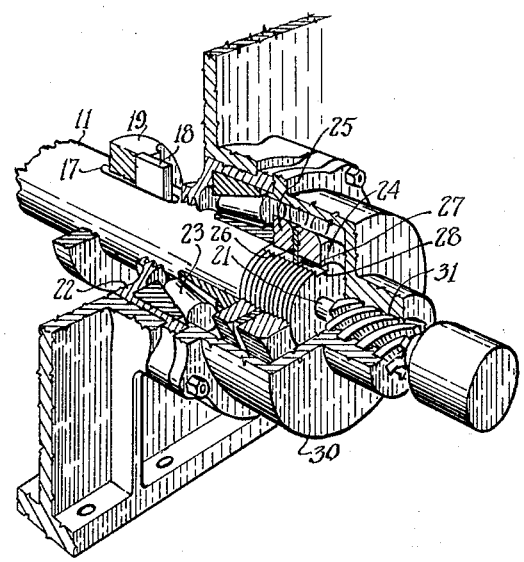

These, and other objects, will become more apparent from the specification following as illustrated in the accompanying drawing, in which:

Figure 1 is a vertical section through a representative form of drum showing its supporting bearings and the thrust mechanism. Figure 2 is a perspective view of the friction thrust with a portion broken away in section to better show the relation of the parts.

Similar numbers of reference refer to similar parts throughout the several views.

Referring in detail to the drawing, in order to illustrate this invention there is shown a drum 10 loosely mounted on a shaft 11 on which is keyed a gear 12 whose friction blocks 13 occupy a groove 14 in the flange 15 of the drum 10. The blocks 13 are urged out of engagement with the groove 14 by springs 16, and the shaft 11 is provided with a slot 17 to receive a key 18 which engages the collar 19 between which and the drum is placed a friction washer 20. A pin 21 slidably passes through the end of the shaft 11 and touches the key 18.

The flanged bushings 22 form housings for the tapered roller bearings 23 at the ends of the shaft 11. The nuts 24 and 25 are screwed on to the end of the shaft 11 and are prevented from turning by the washers 26 whose inturned lugs 27 rest within the key slots 28 and whose ends 29 are turned against the flat sides of the nuts.

Over one bushing 22 is placed a cover 30 through whose threaded end is passed a screw 31 which can be operated by a crank 32 in a manner to exert a thrust against the pin 21.

Over the opposite bushing 22 is placed a cover through whose end projects the portion 34 of the shaft 11. In some instances this may be employed to mount a gypsy head 35 or other element.

The operation of the device is as follows: When desiring to frictionally engage the gear 12 and the drum 10 the operator rotates the crank 32 in a direction which will cause the pin 21 to slide the drum 10 along its shaft toward the gear 12. It can easily be seen that the reaction of such a thrust returns in opposite directions toward the bearing 23 on the crank end of the device; whereas little or no end thrust is imposed on the bearing on the gypsy end of the device, except possibly one of very slight moment when the screw 31 is being backed away from the pin 21.

It can be seen that by this simple construction all straight and flat bearings are eliminated and the thrusts are all taken up in the one bearing, producing a device which is exceedingly simple to manufacture and having a minimum of internal friction.

I claim:

The combination of a shaft member having opposed tapered roller bearings at the ends thereof with a driving and driven member on said shaft, one of which is rotatably and slidably mounted thereon and the other of which is secured thereon, said driving and driven members having means for bringing same into frictional engagement by sliding the movable element, said means consisting of a thrust pin in one end of said shaft projecting from one of said roller bearings, said thrust pin having an operating connection with the sliding member on said shaft, the ends of which shaft are threaded outside of said roller bearings, adjustable nuts on said threaded portions bearing against the outer side of the central portions of said bearings, and a thrust screw having a stationary support adapted to transfer its reactions directly to said thrust pin and to the opposite side of the outer portion of the bearing nearest said screw whenever said screw is moved toward said thrust pin.

SIDNEY B. GORBUTT.